Aug. 21, 1923.
A. G. OGDEN
1,465,283
PHOTOGRAPHIC PRINTING DEVICE
Filed March 7, 1921
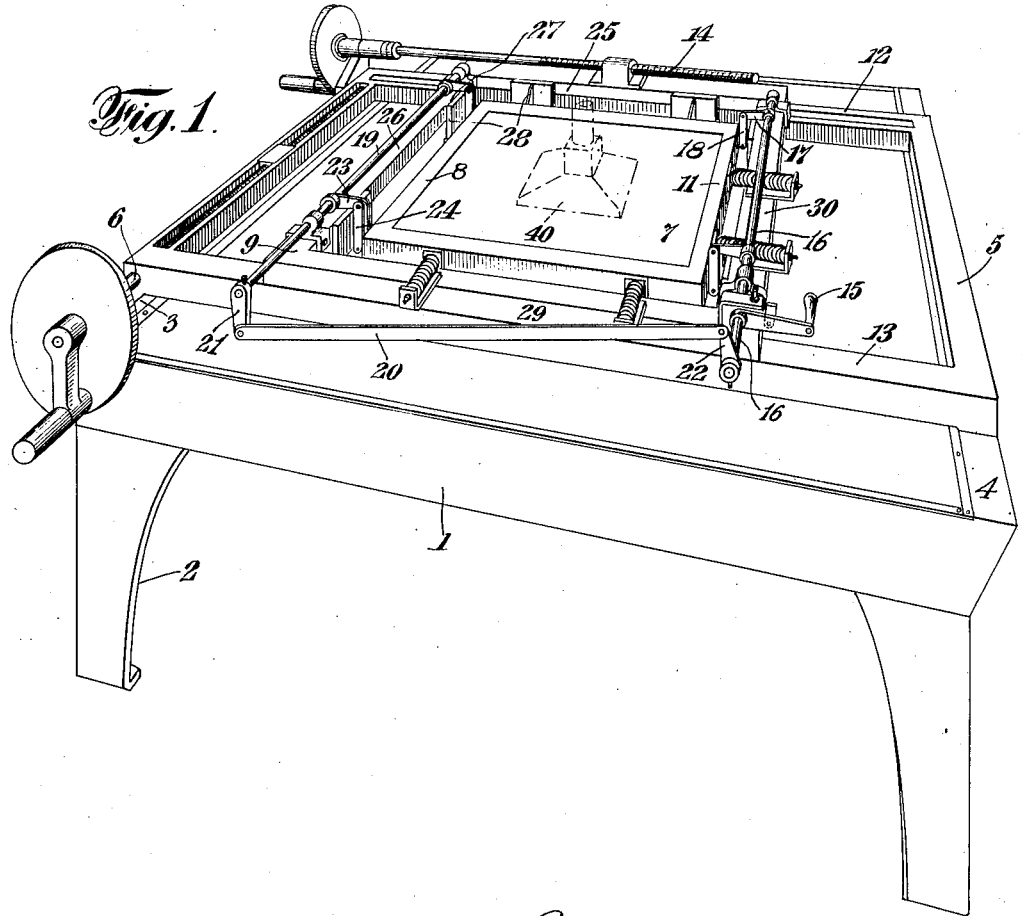
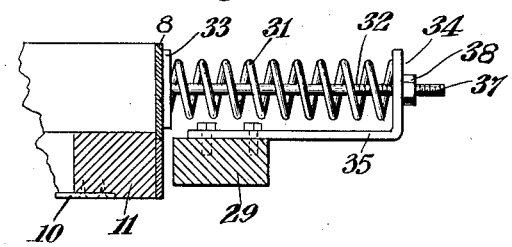

Patented Aug. 21, 1923.

1,465,283

UNITED STATES PATENT OFFICE.

ASHLEY G. OGDEN, OF BALTIMORE, MARYLAND.

PHOTOGRAPHIC-PRINTING DEVICE.

Application filed March 7, 1921. Serial No. 450,310.

*To all whom it may concern:*

Be it known that I, ASHLEY G. OGDEN, a citizen of the United States, and a resident of Baltimore, county of Baltimore, and State of Maryland, have invented certain new and useful Improvements in Photographic-Printing Devices, of which the following is a specification.

This invention relates to photographic printing devices and is herein disclosed as applied to a machine for photographically producing lithographic plates, the machine illustrated being of the general type shown in the patent to Ogden, Reissue No. 14,517, dated September 3, 1918. In such and other machines a sensitized surface of relatively large dimensions is used to receive a plurality of exposures or prints from a single small negative, and these exposures upon the sensitized surface must be aligned and centered with very great accuracy, since the plates are often used as part of a system of color printing, with the result that almost microscopic irregularities in the centering of the various exposures result in the production of plates which print imperfectly over a part of their surface.

For the purpose of obtaining great accuracy in printing upon or exposing such sensitized surfaces, the negative, as shown in said reissue patent, is mounted in a negative holder firmly held in a table support of great massiveness so that superposed carriages shiftable across the table may be brought accurately to the various positions desired by suitable screw drives which carry them along extremely rigid tracks. The holder for the sensitized surface is shown as mounted in a cradle in the upper one of these carriages, the cradle being slidable vertically to enable the sensitized surface to be raised and then shifted across the negative without the likelihood of injuring either during the transverse shifting.

According to the present invention the cradle may slide vertically against smooth surfaces preferably on two adjacent sides of the carriage and may be pressed into position against said surfaces by spring devices which brace the cradle firmly enough to bring the plate-holder and the sensitized surface in it to the desired position and yet allow the cradle to be raised and lowered by the usual devices. This enables a cradle to be used which cannot be jammed between the surfaces which are supposed to guide it, and at the same time enables carriages to be used which will center the sensitized surface with the exact accuracy demanded. Other features and advantages will hereinafter appear.

In the accompanying drawing—

Figure 1 is a perspective view of a machine of the kind shown in said reissue patent showing the present invention as applied thereto;

Figure 2 is a sectional view of a detail showing a spring upon the carriage pushing the cradle into position.

The massive table 1 of the printing device is supported on legs 2 and is provided with a V-shaped rail 3 and a flat rail 4 so that a main carriage 5 may be slid back and forth over the table 1 by the usual screw drive 6. The sensitized surface holder or plate-holder 7 is supported in a cradle 8 of a secondary carriage 9 by lugs 10 which project inwardly to a short distance from the side pieces 11 of a frame seated in the cradle 8. The secondary carriage 9 is shiftable on the V-shaped rail 12 and flat rail 13 of the main carriage by the usual screw drive 14.

In order to lift the cradle 8 and with it the plate-holder 7 to enable it to be safely shifted across the table 1 by either the drive 6 or the drive 14, there is provided upon the secondary carriage 9 a handle 15 which is adapted to lift the cradle because it operates a shaft 16 having rock arms 17 thereon connected by links 18 to one of the side pieces of the cradle 8. The rock arms 17 lift one side of the cradle, and for lifting the other side there is provided a second shaft 19 connected by a link 20 and rock arms 21 and 22 to the first shaft 16, and provided with rock arms 23 connected by links 24 to another side piece of the cradle 8, with the result that when the handle 15 is operated the two shafts 16 and 19 rock together and lift the cradle 8 and the plate-holder 7 therein in horizontal position.

In order to center the cradle 8 in the secondary carriage 9 the side piece 25 and the end piece 26 of the secondary carriage are provided with smooth vertical faces or guides 27 against which bear wear pieces 28 fast on the adjacent members of the cradle 8. The faces 27 are often lugs planed smooth on the respective members 25 and 26 of the secondary carriage 8 and may be comparatively narrow,—only wide enough to obtain adequate wearing surface and not have a surface which covers enough area to gather a great deal of dust and thus possibly throw the cradle 8 out of line. In order to press the cradle 8 against the vertical pieces 27 by its wear pieces 28 in the structure here shown, the side 29 of the secondary carriage 9 and the side 30 thereof, which are the adjacent sides facing the two adjacent sides 25 and 26, are provided with suitable spring devices adapted to bear against the adjacent faces of the cradle and hold the wear pieces 28 always in contact with the vertical solid pieces 27. The spring devices are herein shown as comprising strong spiral springs 31 embracing bolts or rods 32 which terminate in broad flat wear pieces or slides 33 against which the springs bear and which in turn have polished faces bearing against polished surfaces upon the cradle 8. The springs 31 thrust against the wear pieces 33 because their outer ends thrust strongly against the upturned ends 34 of brackets 35 strongly bolted to the adjacent member 29 or 30 of the subsidiary carriage 9. To prevent the springs 31 from expanding too far the rods 32 are threaded at their outer ends at 37 and are provided with nuts 38 which limit the throw of the bolts or rods 32.

It will be noted that this structure prevents any jamming of the cradle in the subsidiary carriage, since the springs 31 yield and permit the cradle to shift where there is tendency to jam. Owing to the rigidity of the carriages 5 and 9 and the table 1, the usual pressure head 40 can be used with impunity to overcome the friction of the spring-pressed wear pieces upon the cradle without distorting any part of the device.

Having thus described one embodiment of my invention, what I claim is:

1. In a photographic printing device, the combination with a negative support of a cradle adapted to be moved to and from said support, a carriage for supporting the cradle, guides for the cradle on the carriage located on adjacent sides thereof, and springs in cooperation with said cradle and carriage for holding the cradle against the guides.

2. In a photographic printing device, the combination with a negative support, of a cradle adapted to be moved to and from said support, a carriage in which the cradle is so moved, smooth guides for the cradle at two adjacent sides of the carriage, springs upon the other two sides of the carriage, and slides bearing against the cradle and held by said springs to hold the cradle against the guides.

3. In a photographic printing device, the combination with a negative support, of a cradle adapted to be moved to and from said support, a carriage slidable transversely of the support and upon which the cradle is hung, guides on said carriage for the cradle at two adjacent sides thereof, and yieldable devices in cooperation with said cradle and carriage for holding the cradle adjacent said guides as it moves to and from the support.

4. In a photographic printing device, the combination with a negative support, of a cradle for supporting a sensitized surface, a main carriage slidable upon the support to carry the cradle transversely of the support, a secondary carriage slidable transversely of the main carriage to carry the cradle transversely of the support and at right angles to its first motion, lifting devices upon the secondary carriage for lifting the cradle from the support, guides for said cradle for holding it against sliding on said secondary carriage in two transverse directions, and strong springs in cooperation with said cradle and secondary carriage for holding the cradle against its guides.

5. In a photographic printing device, the combination with a negative support, of a cradle for supporting a sensitized surface, a main carriage slidable upon the support to carry the cradle transversely of the support, a secondary carriage slidable transversely of the main carriage to carry the cradle transversely of the support and at right angles to its first motion, lifting devices upon the secondary carriage for lifting the cradle from the support, guides for said cradle for holding it against sliding in two transverse directions, brackets upon the secondary carriage, and springs mounted upon said brackets and adapted to hold the cradle to its guides.

6. In a photographic printing device, the combination with a negative support, of a cradle adapted to be moved to and from said support, a carriage for said cradle, means for shifting the cradle transversely of the support, guides on said carriage for said cradle for holding it against sliding in two transverse directions, strong springs in cooperation with said carriage and cradle for holding the cradle against its guides, and means for positively moving the cradle toward and from the support.

7. In a photographic printing device, the combination with a negative support, of a cradle adapted to carry a sensitized surface and be moved to and from said support, a carriage for said cradle, means for shifting the cradle transversely of the support, guides on said carriage for said cradle for holding it against sliding in two transverse directions, strong springs in cooperation with said cradle and carriage for holding the cradle against its guides, means for positively moving the cradle toward and from the support, and a pressure head for pressing the sensitized surface against the negative.

8. In a photographic printing device, the combination with a negative support, of a support for a sensitized surface, a cradle for holding one of said supports, a carriage for shifting the cradle across the other support, a device in said carriage for yieldably holding the cradle against sliding, and means upon the carriage for positively shifting the cradle to carry the sensitized surface toward and from the other support.

9. In a photographic printing device, the combination with a negative support, of a support for a sensitized surface, a cradle for carrying one of said supports, a carriage for shifting the cradle across the other support, a device in said carriage for resiliently holding the cradle against sliding, means upon the carriage for positively shifting the cradle to carry it toward and from the other support, and a pressure head adapted to force one support against the other.

10. In a photographic printing device, the combination with a negative support, of a cradle for supporting a sensitized surface, a carriage for shifting the cradle across the support, guides in said carriage for holding said cradle against sliding in two transverse directions, strong springs in the carriage for holding the cradle against its guides, a pressure head adapted to press down upon a sensitized surface in the cradle to carry it against the negative, and means for lifting the sensitized surface away from the negative.

11. In a photographic printing device, the combination with a negative support, of a cradle for supporting a sensitized surface, a carriage for shifting the cradle across the support, guides in said carriage for holding said cradle against sliding in two transverse directions, strong springs in the carriage for holding the cradle against its guides, a pressure head adapted to press down upon a sensitized surface in the cradle to carry it against the negative, means for lifting the sensitized surface away from the negative, and means for positively moving the cradle toward and from the support.

12. The combination with a negative support, of a support for a sensitized surface, a means for accurately positioning one of said supports relative to the other, said means comprising two guides arranged at an angle to one another, and a thrust device for exerting component forces upon one of said supports to urge the same against said guides.

13. In a photographic device, the combination with a negative and a sensitized surface, of a support for holding one of them in moving it relative to the other, a carriage for said support, at least two guides on said carriage arranged at an angle to one another, and a device in cooperation with said carriage and support, said device being adapted to urge said support into intimate engagement with one of said guides.

In testimony whereof, I have affixed my signature to this specification.

ASHLEY G. OGDEN.